(12) United States Patent
Shah et al.

(10) Patent No.: US 12,547,007 B2
(45) Date of Patent: Feb. 10, 2026

(54) FIT DETECTION FOR HEAD-MOUNTABLE DEVICES

(71) Applicant: Apple Inc., Cupertino, CA (US)

(72) Inventors: Ritu Shah, Sunnyvale, CA (US); Yoonhoo Jo, Santa Cruz, CA (US); Forrest C. Wang, Petaluma, CA (US); Scott M Leinweber, Sunnyvale, CA (US); Adam Y. Kollgaard, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 18/122,056

(22) Filed: Mar. 15, 2023

(65) Prior Publication Data

US 2023/0229007 A1    Jul. 20, 2023

Related U.S. Application Data

(63) Continuation of application No. PCT/US2021/046675, filed on Aug. 19, 2021.

(60) Provisional application No. 63/078,813, filed on Sep. 15, 2020.

(51) Int. Cl.
*G02B 27/01*    (2006.01)
*G02B 27/00*    (2006.01)

(52) U.S. Cl.
CPC ..... *G02B 27/0176* (2013.01); *G02B 27/0093* (2013.01); *G02B 27/0172* (2013.01); *G02B 2027/0138* (2013.01); *G02B 2027/014* (2013.01)

(58) Field of Classification Search
CPC ............ G02B 27/0176; G02B 27/0093; G02B 27/0172; G02B 2027/0138; G02B 2027/014; G02B 2027/0187
USPC .......................................................... 359/630
See application file for complete search history.

(56) References Cited

U.S. PATENT DOCUMENTS

2018/0095498 A1\* 4/2018 Raffle ................ G06K 7/10297
2020/0233453 A1  7/2020 Hatfield
2021/0208393 A1\* 7/2021 Clark .................... G01B 11/24

FOREIGN PATENT DOCUMENTS

WO    WO 2018/231213    12/2018

OTHER PUBLICATIONS

International Search Report and Written Opinion from PCT/US2021/046675, dated Dec. 6, 2021, 13 pages.

\* cited by examiner

*Primary Examiner* — William R Alexander
(74) *Attorney, Agent, or Firm* — BAKERHOSTETLER

(57) ABSTRACT

A head-mountable device can include modules that provide fit adjustment capabilities when assembled together. By providing a head-mountable device with modular features, certain modules can provide fit adjustment capabilities without requiring other modules to be custom designed or available in a wide variety of sizes and/or shapes. The head-mountable device and/or other electronic devices can be operated to guide a user to select the optimal light seal module for use with an HMD module. For example, the head-mountable device or another device can include sensors for detecting features of the user's face, forces distributed on the face when worn, and/or entry of light from an external environment.

20 Claims, 7 Drawing Sheets

FIT DETECTION FOR HEAD-MOUNTABLE DEVICES

This application is a continuation of International Application No. PCT/US2021/046675, entitled "FIT DETECTION FOR HEAD-MOUNTABLE DEVICES," filed Aug. 19, 2021, which claims the benefit of U.S. Provisional Application No. 63/078,813, entitled "FIT DETECTION FOR HEAD-MOUNTABLE DEVICES," filed Sep. 15, 2020, the entirety of which is incorporated herein by reference.

TECHNICAL FIELD

The present description relates generally to head-mountable devices, and, more particularly, to fit detection for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
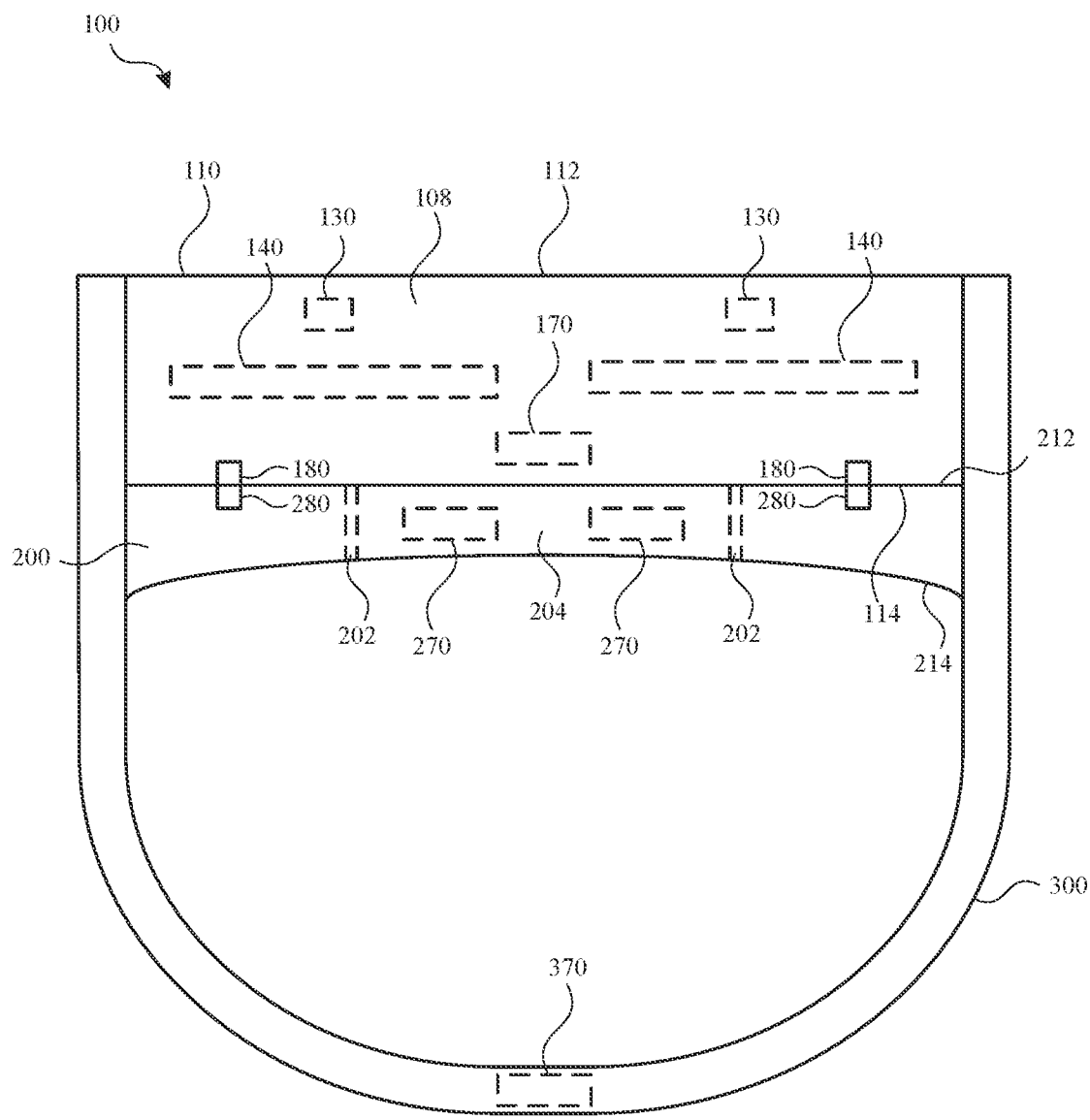
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display element that visually outputs display-based information toward the eyes of the user. The position and orientation of the display elements relative to the eyes depends, at least in part, on how the head-mountable device is positioned on the face of the user. Due to variations in facial features across different users, a given head-mountable device may require adjustment to accommodate different users. For example, different users can have different facial features (e.g., face plane slope, forehead size, eye location). Accordingly, different users may perceive the displayed information differently unless a preferred arrangement is provided.

It can be costly to require each user to acquire an entire head-mountable device that is specifically tailored to their facial features. In particular, such an approach would require customization of each head-mountable device and/or the ability to choose from a wide variety of head-mountable devices.

Systems of the present disclosure can provide a head-mountable device with modules that provide fit adjustment capabilities when assembled together. By providing head-mountable devices with modular features, certain modules can provide fit adjustment capabilities without requiring other modules to be custom designed or available in a wide variety of sizes and/or shapes. For example, a light seal module that provides engagement of a user's face and transmits light from a display element can be coupled to an HMD module. The light seal module can be provided in a wide variety of sizes and/or shapes to allow any given user to select an appropriate one for optimal alignment of an HMD module. The head-mountable device and/or other electronic devices can be operated to guide a user to select the optimal light seal module for use with an HMD module. For example, the head-mountable device or another device can include sensors for detecting features of the user's face, forces distributed on the face when worn, and/or entry of light from an external environment.

These and other embodiments are discussed below with reference to FIGS. 1-11. However, those skilled in the art will readily appreciate that the detailed description given herein with respect to these Figures is for explanatory purposes only and should not be construed as limiting.

According to some embodiments, for example as shown in FIG. 1, a head-mountable device 100 includes an HMD module 110 and a light seal module 200. The HMD module 110 includes a frame 108 that is worn on a head of a user. The frame 108 can be positioned in front of the eyes of a user to provide information within a field of view of the user. The HMD module 110 and/or the light seal module 200 can provide nose pads and/or other portions to rest on a user's nose, forehead, cheeks, and/or other facial features as described further herein.

The frame 108 can be supported on a user's head with the securement element 300. The head securement element 300 can wrap around or extend along opposing sides of a user's head. The securement element 300 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the head securement element 300 can include multiple components to engage a user's head. The head securement element 300 can extend from the HMD module 110 and/or the light seal module 200.

The frame 108 can provide structure around a peripheral region thereof to support any internal components of the frame 108 in their assembled position. For example, the frame 108 can enclose and support various internal components (including for example integrated circuit chips, processors, memory devices and other circuitry) to provide computing and functional operations for the head-mountable device 100, as discussed further herein. While several components are shown within the frame 108, it will be understood that some or all of these components can be located anywhere within or on the head-mountable device 100. For example, one or more of these components can be positioned within the head securement element 300, the light seal module 200, and/or the HMD module 110 of the head-mountable device 100.

The frame 108 can include and/or support one or more cameras 130. The cameras 130 can be positioned on or near an outer side 112 of the frame 108 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include display elements 140 that provide visual output for viewing by a user wearing the head-mountable device 100. One or more display elements 140 can be positioned on or near an inner side 114 of the frame 108. As used herein, an inner side 114 of a portion of a head-mountable device is a side that faces toward the user and/or away from the external environment.

A display element 140 can transmit light from a physical environment (e.g., as captured by a camera) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance of the user. IPD is defined as the distance between the centers of the pupils of a user's eyes.

The pair of display elements 140 can be mounted to the frame 108 and separated by a distance. The distance between the pair of display elements 140 can be designed to correspond to the IPD of a user. The distance can be adjustable to account for different IPDs of different users that may wear the head-mountable device 100. For example, either or both of the display elements 140 may be movably mounted to the frame 108 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 108 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

The head-mountable device 100 can include one or more user sensors for tracking features of the user wearing the head-mountable device 100. Such a sensor can be located at, included with, and/or associated with the HMD module 110, the light seal module 200, and/or the head securement element 300. For example, a user sensor can include or accompany a face sensor 170 and/or a light sensor of the HMD module 110, a force sensor 270 of the light seal module 200, and/or a head securement sensor 370 of the head securement element 300.

By further example, a user sensor can perform facial feature detection, facial movement detection, facial recognition, eye tracking, user mood detection, user emotion detection, voice detection, etc. Such eye tracking may be used to determine a location of information to be displayed on the display elements 140 and/or a portion (e.g., object) of a view to be analyzed by the head-mountable device 100. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

One or more sensors can be provided to detect a fit of the light seal module 200 with respect to a face of a user. For example, the HMD module 110 and/or another component of the head-mountable device 100 can include a light sensor for detecting light within the light seal module 200, as described further herein. By further example, the light seal module 200 and/or another component of the head-mountable device 100 can include a force sensor 270 for detecting forces applied to regions of the face of the user, as described further herein. By further example, the head securement element 300 and/or another component of the head-mountable device 100 can include a head securement sensor 370 for detecting tension in or another condition of the head securement element 300. Operation of such sensors can facilitate determination of which of a variety of light seal modules is recommended for user by a particular user.

As further shown in FIG. 1, the light seal module 200 can include a chassis 202 that provides structural support to one or more other components of the light seal module 200. The chassis 202, or portions thereof, can extend to, from, and/or between the inner side 214 and the outer side 212. The chassis 202 can support a cover 204 that extends at least partially from the outer side 212 to the inner side 214. The chassis 202 and/or the cover 204 can define an interior space through which light can pass, thereby providing to the user wearing the head-mountable device a view of a display elements 140 of the HMD module 110. Such a view can be enhanced by preventing the ingress of light from the external environment and into the light seal module 200.

The components of the head-mountable device 100 can be provided with modular configurations that facilitate engagement (e.g., assembly) and release. As used herein, "modular" or "module" can refer to a characteristic that allows an item, such as a light seal module, to be connected, installed, removed, swapped, and/or exchanged by a user in conjunction with another item, such as an HMD module of a head-mountable device. Connection of a light seal module, a head securement element, and/or an HMD module can be performed and reversed, followed by disconnection and connection of another module replacing the prior module. As such, multiple modules can be exchangeable with each other with respect to another module.

Attachment elements can facilitate coupling of the HMD module 110 to the light seal module 200 in a relative position and orientation that aligns the display elements 140 of the HMD module 110 in a preferred position and orientation for viewing by the user. The HMD module 110 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 110 and the light seal module 200 together. The modules can remain secured to each other until an optional release mechanism is actuated. The release mechanism can be provided on an outer surface of the head-mountable device 100 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 100. For example, the inner side 214 can provide a shape that generally matches the contours of the user's face around the eyes of the user, as described further herein. The inner side 214 can be provided with one or more features that allow the light seal module 200 to conform to the face of the user to enhance comfort and block light from entering the light seal module 200 at the points of contact with the face. For example, the inner side 214 can provide a flexible, soft, elastic, and/or compliant structure.

While the head-mountable device 100 is worn by a user, with the inner side 214 of the light seal module 200 against the face of the user and/or with the head securement element 300 against the head of the user, the light seal module 200 can remain in a fixed location and orientation with respect to the face and head of the user. Furthermore, in such a configuration the HMD module 110 can also be maintained in a fixed location and orientation with respect to the face and head of the user. Given the variety of head and face shapes that different users may have, it can be desirable to provide a light seal module 200 with customization and exchangeability so that the HMD module 110 is in a desired position and orientation with respect to the face and head of the user during use.

Referring now to FIGS. 2-6, a device having a face sensor can be operated to detect and/or measure one or more regions of a face of a user. Such detections and measurements can be used to determine which of a variety of light seal modules is most appropriate to achieve a desired fit with respect to the face of the user.

Figure 2:
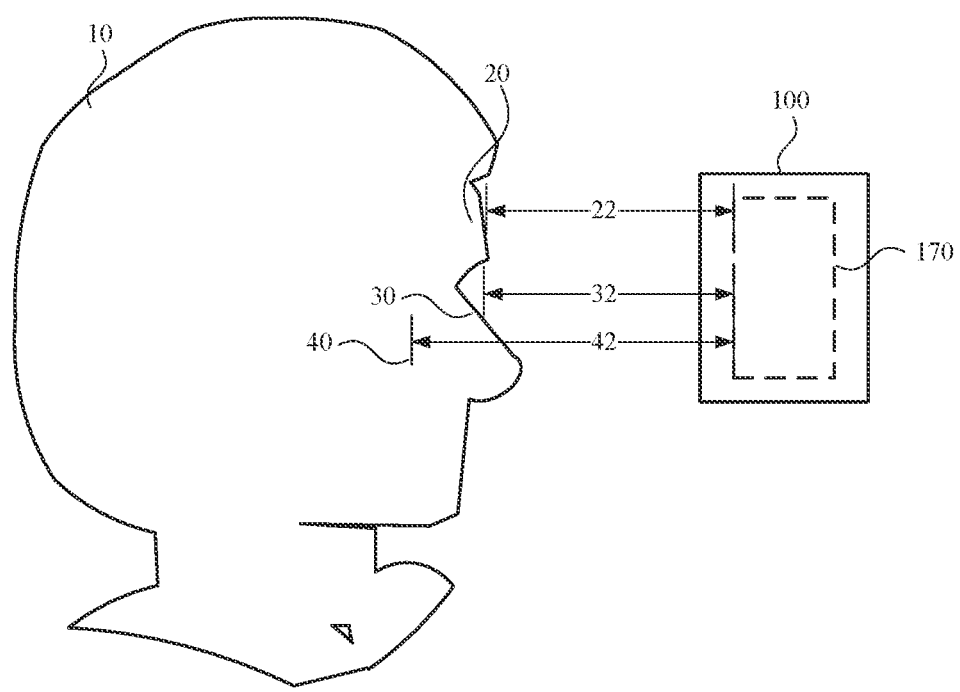
FIG. 2 illustrates a side view of a head-mountable device in use to measure distances to different face regions of a user, according to some embodiments of the present disclosure.

As shown in FIG. 2, a head-mountable device 100 or another electronic device can provide a face sensor 170 that is operable to measure distances to multiple regions of the face of a user 10. Such regions can include the regions that would be engaged by a light seal module when the head-mountable device 100 is worn by the user. For example, the regions can include a forehead 20, a nose 30, and/or one or both cheeks 40.

The face sensor 170 can include one or more types of sensors. For example the face sensor 170 can include one or more image sensors, depth sensors, thermal (e.g., infrared) sensors, and the like. By further example, a depth sensor can be configured to measure a distance (e.g., range) to an object (e.g., region of the user's face) via stereo triangulation, structured light, time-of-flight, interferometry, and the like. Additionally or alternatively, the face sensor and/or the device can capture and/or process an image based on one or more of hue space, brightness, color space, luminosity, and the like.

In FIG. 2, by way of example, the face sensor 170 is depicted as a component of the head-mountable device 100. Additionally or alternatively, the face sensor 170 can be a component of another type of electronic device, such as a portable computing device, a tablet device, a laptop computer, a smartphone, a smart watch, or other appropriate devices that include one or more sensors. The electronic device can be maintained at a fixed location with respect to the user 10, or the electronic device can be moved to map different regions of the face of the user.

The face sensor 170 can measure a distance from the face sensor 170 to each of multiple regions of the face of the user. For example, the face sensor 170 can measure a forehead distance 22 to a forehead 20 of the user 10. By further example, the face sensor 170 can measure a nose distance 32 to a nose 30 of the user 10. By further example, the face sensor 170 can measure a cheek distance 42 to a cheek 40 of the user 10. The face sensor 170 can measure any other regions of the face, such as the eyes and/or other portions that are not to be directly engaged by the light seal module. It will be understood that other regions of the face can be detected and/or measured. Additionally or alternatively, one or multiple distance measurements can be made to each of various regions, such as with respect to multiple sections of the forehead 20, nose 30, and/or cheeks 40.

Figure 3:
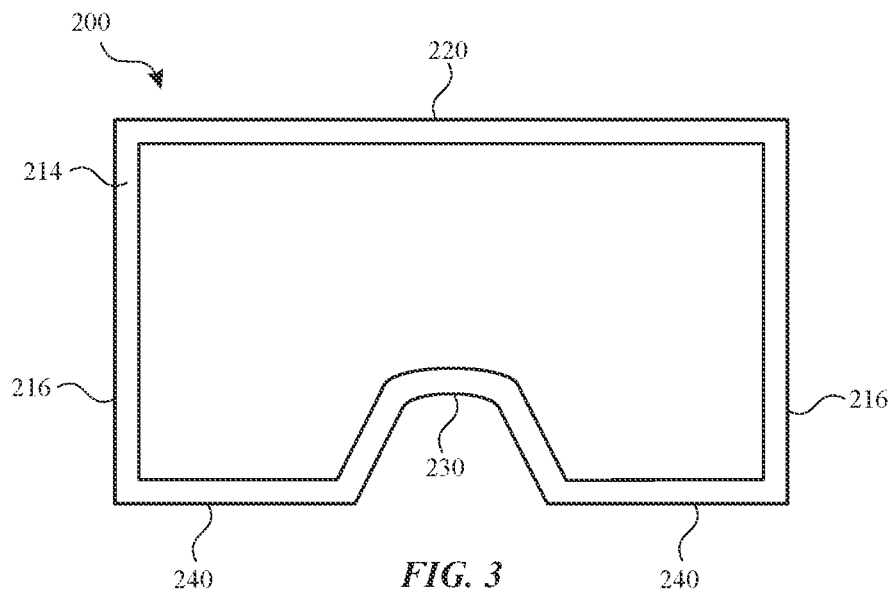
FIG. 3 illustrates a rear view of a light seal module of a head-mountable device, according to some embodiments of the present disclosure.

Based on the distance measurements, a light seal module 200 can be selected with various portions that match the contours of the face of the user. For example, as shown in FIG. 3, a light seal module 200 can include a forehead portion 220 for engaging the forehead of the user, a nose portion 230 for engaging the nose of the user, and cheek portions 240 for engaging the cheeks of the user. By further example, the light seal module 200 can further include side portions 216 configured to engage side of the user's face (e.g., along the temples of the user's head). Any number of other portions can be provided, including sub-components of the portions described herein.

Different light seal modules can differ from each other at least with respect to the dimensions along different portions thereof. For example, different light seal modules can have different thicknesses along different portions to accommodate the face of various different users.

Figure 4:
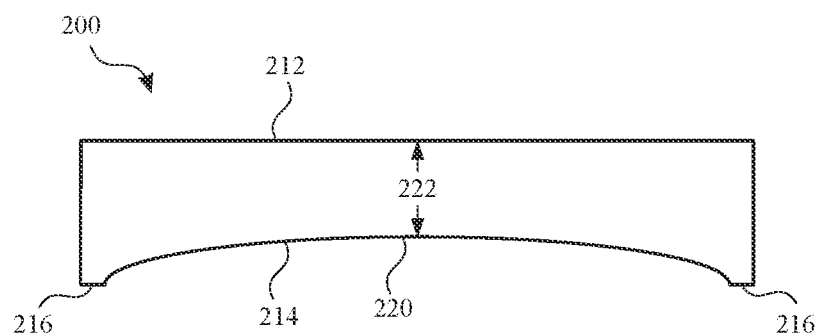
FIG. 4 illustrates a top view of the light seal module of FIG. 3, according to some embodiments of the present disclosure.

As shown in FIG. 4, the light seal module 200 can have a forehead portion thickness 222 representing a distance between the outer side 212 and the inner side 214 at the forehead portion 220 of the light seal module 200. The forehead portion thickness 222 can correspond to the forehead distance 22 measured by the face sensor 170 (see FIG. 2). It will be understood that different forehead portion thickness 222 can apply at different sections of the forehead portion 220, based on corresponding measurements of the forehead distances 22.

As used herein, a thickness can correspond to a distance by being selected based on the measured distance. Such a thickness need not be equal to the measured distance. Rather, the thickness of each portion can be selected based on the measured distances in that the measure distances can form the basis of the calculation to define the facial features of the user across the different measured regions. The calculation can be performed to determine what thicknesses at each portion of a light seal module are needed to place an HMD module at a desired position and/or orientation relative to the head, face, and/or eyes of the user. Where such a desired position and/or orientation are known, the light seal module can be selected as the one having the appropriate thickness to place the HMD module at the desired position and/or orientation when the light seal module is engaged to the HMD module and the face of the user.

Figure 5:
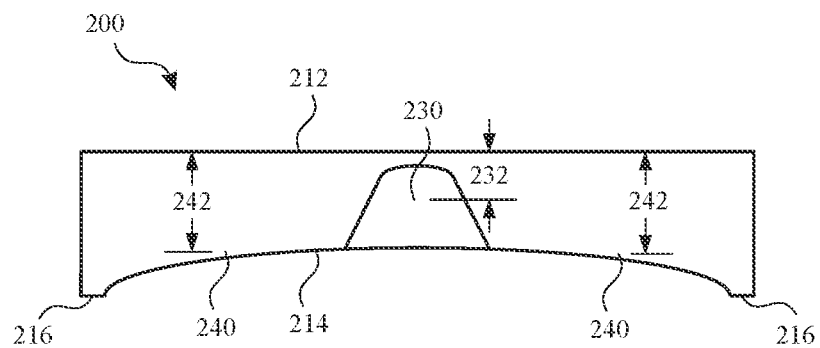
FIG. 5 illustrates a bottom view of the light seal module of FIG. 3, according to some embodiments of the present disclosure.

As shown in FIG. 5, the light seal module 200 can have a nose portion thickness 232 representing a distance within the outer side 212 and the inner side 214 at the nose portion 230 of the light seal module 200. Such a thickness need not extend to either or both of the outer side 212 and the inner side 214 where the light seal module 200 rests a middle portion thereof on the nose of the user. The nose portion thickness 232 can correspond to the nose distance 32 measured by the face sensor 170 (see FIG. 2). It will be understood that different nose portion thicknesses 232 can apply at different sections of the nose portion 230, based on corresponding measurements of the nose distances 32.

As further shown in FIG. 5, the light seal module 200 can have cheek portion thicknesses 242 representing a distance within the outer side 212 and the inner side 214 at the cheek portions 240 of the light seal module 200. Such a thickness need not extend to either or both of the outer side 212 and the inner side 214 where the light seal module 200 rests a middle portion thereof on the cheeks of the user. The cheek portion thicknesses 242 can correspond to the cheek distances 42 measured by the face sensor 170 (see FIG. 2). It will be understood that different cheek portion thicknesses 242 can apply at different sections of the cheek portions 240, based on corresponding measurements of the cheek distances 42.

While FIGS. 4 and 5 illustrate thicknesses, it will be understood that any dimension can be considered for selecting an appropriate light seal module. For example, a width and/or height of any portion and/or between different portions can vary across different light seal modules. Measurements taken by a face sensor can similarly provide the basis for selecting among available light seal modules that have different dimensions (e.g., thickness, width, and/or height).

Figure 6:
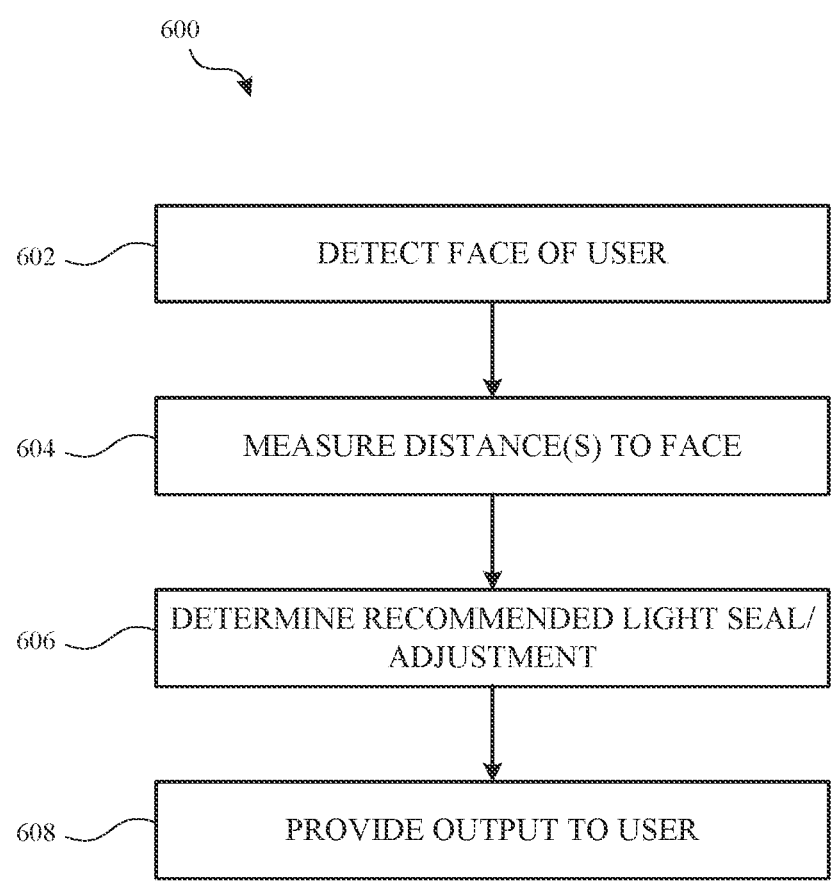
FIG. 6 illustrates a flow chart for a process having operations performed by a head-mountable device, according to some embodiments of the present disclosure.

FIG. 6 illustrates a flow diagram of an example process 600 for determining a recommended light seal module with corresponding output to a user. For explanatory purposes, the process 600 is primarily described herein with reference to the head-mountable device 100 of FIGS. 1 and 2. However, the process 600 is not limited to the head-mountable device 100 of FIGS. 1 and 2, and one or more blocks (or operations) of the process 600 may be performed by different components of the head-mountable device and/or one or more other devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 can begin when the head-mountable device detects a face of a user (602). Such a detection can be made by one or more sensors of the head-mountable device. Additionally or alternatively, the detection can be performed in response to an operational state of the head-mountable device (e.g., on/off state, application launch, user input command, and the like).

A sensor of the head-mountable device (e.g., a face sensor) can measure one or more distances to one or more regions of the face (604). Such regions can include a forehead, nose, and/or cheeks of the user. Optionally, such distance measurements can be made while the head-mountable device or other device is worn by a user.

Based on the measured distances, the head-mountable device can determine a recommended light seal module for use with the HMD module (606). For example, a variety of available light seal modules with known dimensions (e.g., thicknesses, widths, and/or heights) can be compared to the optimal thicknesses, widths, and/or heights that, based on the distance measurements, would place an HMD module at a desired position and/or orientation. The head-mountable device or other device can communicate with another device to retrieve information regarding the available light seal modules, including the dimensions thereof.

Additionally or alternatively, a recommended adjustment can be determined. Such an adjustment can be one that accommodates the user's face based on the distance measurements. An adjustment can be to the HMD module, the light seal module, the head securement element, and/or another component of the head-mountable device. For example, the recommended adjustment can include tightening or loosening the head securement element, which can alter the engagement of the light seal module on the face of the user. Such a recommendation can be based, at least in part, on detections made by a head securement sensor of the head securement element.

Optionally, the determination of a recommended light seal module and/or adjustment can be based, at least in part, on an operational mode and/or activity of the head-mountable device and/or the user. For example, the head-mountable device can recognize and/or provide an indication that an active operation, program, application, and/or activity involves a magnitude and/or type of movement by the user. A particular light seal module and/or adjustment may be recommended to maintain engagement with the face of the user during such an operational mode. Accordingly, the head-mountable device and/or other device can determine the recommended light seal module and/or adjustment for a duration of time (e.g., throughout the duration of the operational mode).

The head-mountable device or other device can provide an output to a user based on the recommended light seal module and/or recommended adjustment (608). For example, the head-mountable device can provide a visual output on the display elements, a sound, or other output that communicates to the user an indication of the recommended light seal module and/or recommended adjustment. The user can then take appropriate actions to acquire, install, and/or employ the recommended light seal module and/or recommended adjustment. In some examples, the head-mountable device can communicate with another system to order a recommended light seal module. The output can further include instructions for installation of the light seal module with the HMD module and/or achieving the recommended adjustment.

Figure 7:
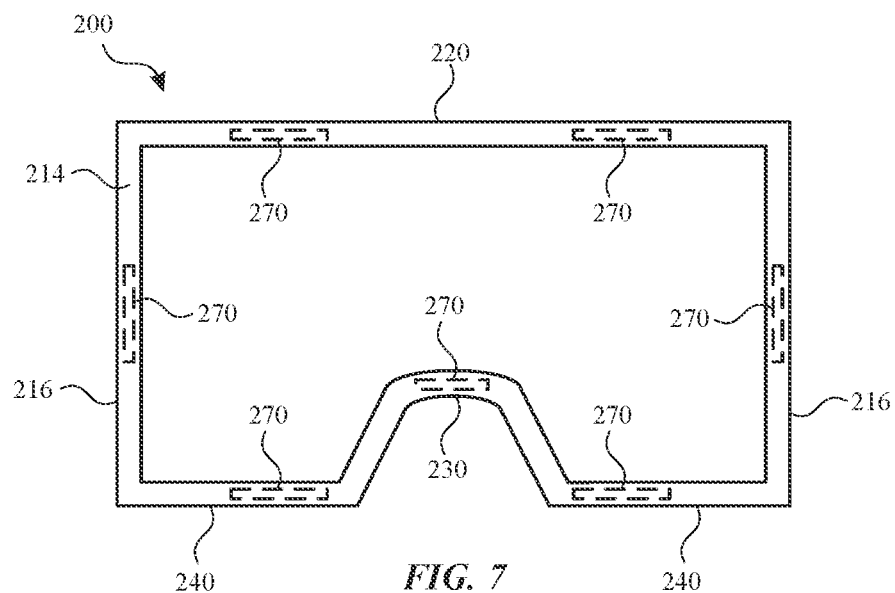
FIG. 7 illustrates a rear view of a light seal module of a head-mountable device, according to some embodiments of the present disclosure.
Figure 8:
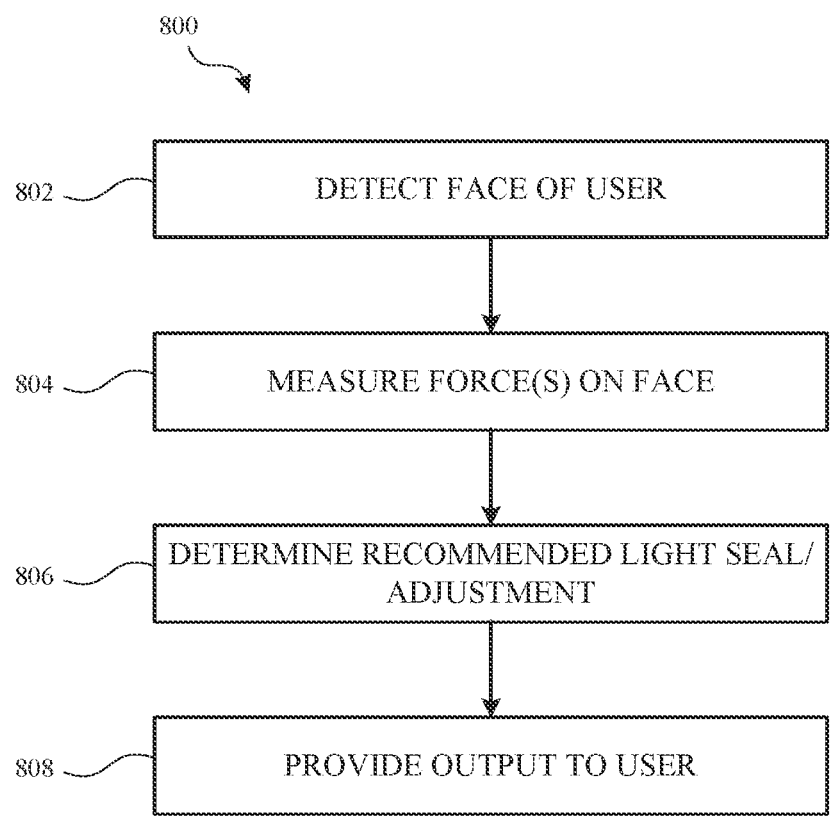
FIG. 8 illustrates a flow chart for a process having operations performed by a head-mountable device, according to some embodiments of the present disclosure.

Referring now to FIGS. 7 and 8, a light seal module or other component of the head-mountable device can include sensors that are operated to detect and/or measure one or more forces on the face of a user. Such detections and measurements can be used to determine which of a variety of light seal modules is most appropriate to achieve a desired fit with respect to the face of the user.

As shown in FIG. 7, a light seal module 200 can provide force sensors 270 that are operable to measure magnitudes of forces applied to multiple regions of the face of a user 10. Such regions can include the regions that are engaged by the light seal module 200 as the head-mountable device 100 is worn by the user. For example, the regions can include a forehead, a nose, and/or one or both cheeks. Accordingly, the force sensors 270 can be positioned at the forehead portion 220, the side portions 216, the nose portion 230, and/or the cheek portions 240.

The force sensor 270 can include one or more types of sensors. The force sensor 270 can include a component that converts mechanical motion and/or deformation of the light seal module 200 into an electric signal. The force sensor 270 can include one or more contact sensors, capacitive sensors, strain gauges, resistive touch sensors, piezoelectric sensors, cameras, pressure sensors, photodiodes, and/or other sensors. The force sensor 270 can detect both the presence and magnitude of a force.

Each of the force sensors 270 can measure a force applied to the face of the user at its vicinity. For example, the force sensors 270 can measure forces applied to the forehead, nose, cheeks, and/or temples of the user. It will be understood that other regions of the face where contact is made can be detected and/or measured. Additionally or alternatively, one or multiple force measurements can be made to each of various regions, such as with respect to multiple sections of the forehead, nose, and/or cheeks.

Based on the force measurements, a light seal module 200 can be selected with various portions that match the contours of the face of the user. For example, a recommended light seal module 200 can be one that provides a more balanced or preferred distribution of forces than that of the light seal module 200 used initially for measuring forces. By further example, where forces are measured to be excessively high in a given region, a recommended light seal module 200 can be one on which engagement at that region will be lighter (e.g., smaller thickness to better accommodate facial contours). It will be understood that any dimensions (e.g., thickness, width, and/or height) of a recommended light seal module 200 can be considered, as described herein.

FIG. 8 illustrates a flow diagram of an example process 800 for determining a recommended light seal module with corresponding output to a user. For explanatory purposes, the process 800 is primarily described herein with reference to the head-mountable device 100 of FIGS. 1 and 7. However, the process 800 is not limited to the head-mountable device 100 of FIGS. 1 and 7, and one or more blocks (or operations) of the process 800 may be performed by different components of the head-mountable device and/or one or more other devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The process 800 can begin when the head-mountable device detects a face of a user (802). Such a detection can be made by one or more sensors of the head-mountable device. Additionally or alternatively, the detection can be performed in response to an operational state of the head-mountable device (e.g., on/off state, application launch, user input command, and the like).

A sensor of the head-mountable device (e.g., a force sensor) can measure one or more forces applied to one or more regions of the face (804). Such regions can include a forehead, nose, and/or cheeks of the user. Optionally, such force measurements can be made while the head-mountable device is worn by a user.

Based on the measured distances, the head-mountable device can determine a recommended light seal module for use with the HMD module (806). For example, a variety of available light seal modules with known dimensions (e.g., thicknesses, widths, and/or heights) can be compared to the optimal thicknesses, widths, and/or heights that, based on the force measurements, would place an HMD module at a desired position and/or orientation. The head-mountable device or other device can communicate with another device to retrieve information regarding the available light seal modules, including the dimensions thereof.

Additionally or alternatively, a recommended adjustment can be determined. Such an adjustment can be one that more favorably distributes forces applied to the face of the user. An adjustment can be to the HMD module, the light seal module, the head securement element, and/or another component of the head-mountable device. For example, the recommended adjustment can include tightening or loosening the head securement element, which can alter the magnitude and/or distribution of forces on the face of the user. Such a recommendation can be based, at least in part, on detections made by a head securement sensor of the head securement element.

Optionally, the determination of a recommended light seal module and/or adjustment can be based, at least in part, on an operational mode and/or activity of the head-mountable device and/or the user. For example, the head-mountable device can recognize and/or provide an indication that an active operation, program, application, and/or activity involves a magnitude and/or type of movement by the user. A particular light seal module and/or adjustment may be recommended to maintain engagement with the face of the user during such an operational mode. Accordingly, the head-mountable device and/or other device can determine the recommended light seal module and/or adjustment for a duration of time (e.g., throughout the duration of the operational mode).

The head-mountable device or other device can provide an output to a user based on the recommended light seal module and/or recommended adjustment (808). For example, the head-mountable device can provide a visual output on the display elements, a sound, or other output that communicates to the user an indication of the recommended light seal module and/or recommended adjustment. The user can then take appropriate actions to acquire, install, and/or employ the recommended light seal module and/or recommended adjustment. In some examples, the head-mountable device can communicate with another system to order a recommended light seal module. The output can further include instructions for installation of the light seal module with the HMD module and/or achieving the recommended adjustment.

Figure 9:
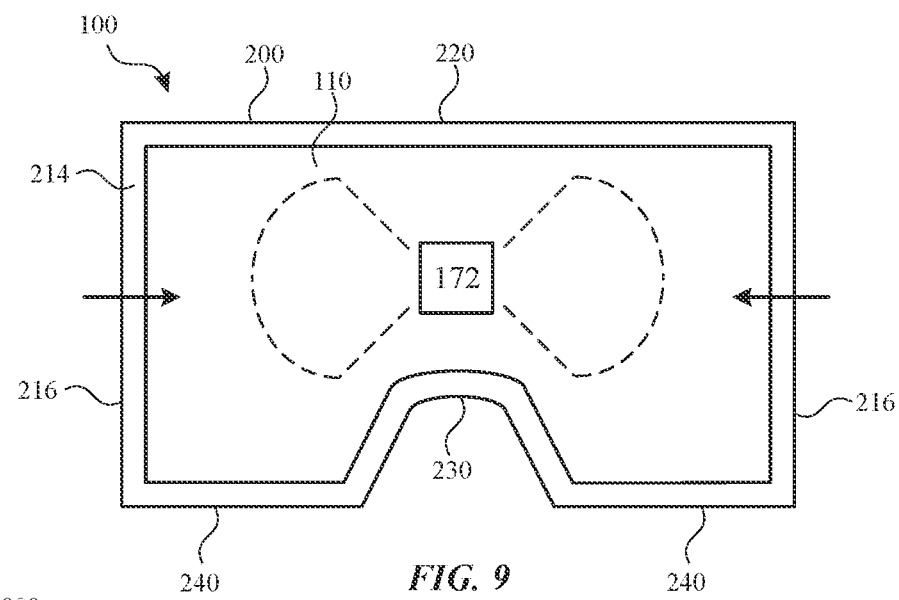
FIG. 9 illustrates a rear view of a head-mountable device, according to some embodiments of the present disclosure.
Figure 10:
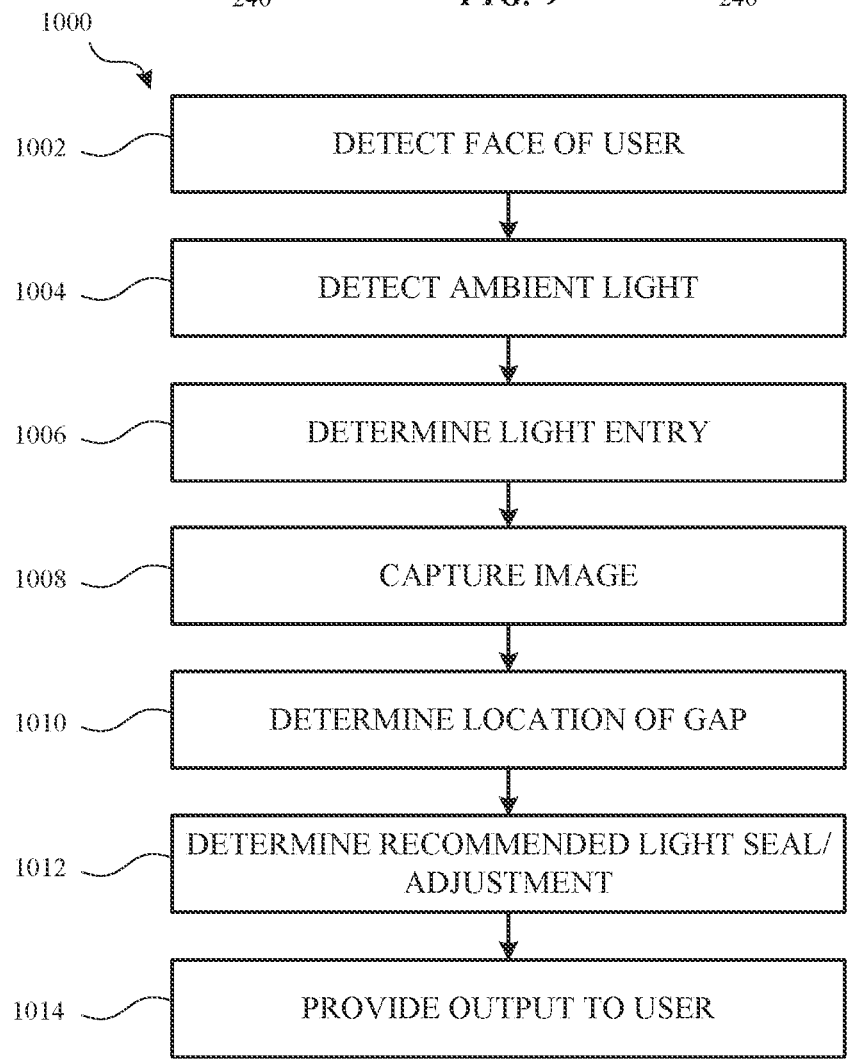
FIG. 10 illustrates a flow chart for a process having operations performed by a head-mountable device, according to some embodiments of the present disclosure.

Referring now to FIGS. 9 and 10, a head-mountable device can include sensors that are operated to detect and/or measure an entry of light past a light seal module. Such detections and measurements can be used to determine which of a variety of light seal modules is most appropriate to achieve a desired fit with respect to the face of the user.

As shown in FIG. 9, an HMD module 110 can provide one or more light sensors 172 that are operable to detect, measure, and/or identify an entry of light past a light seal module. A light seal module 200 can preferably engage a face of a user in a manner that sufficiently blocks light, so that the user can observe the light from display elements 140. Where the light seal module 200 is less optimally fit to the user, openings may appear between the light seal module 200 and the face of the user. Such openings may appear at any portion of the intended seal. For example, light can enter between the forehead portion 220 and the forehead, the side portions 216 and the temples, the nose portion 230 and the nose, and/or the cheek portions 240 and the cheeks. Accordingly, the light sensors 172 can be directed to detect light from any portion and identify the source of the light.

The light sensors 172 can include one or more types of sensors. For example, the light sensors 172 can include ambient light sensors, cameras, photodiodes, and the like. Multiple light sensors can operate in concert. For example, an ambient light sensor can be operated continually or often to detect whether an excessive amount of light is within the light seal module 200. If such a detection is made, then a camera or other light sensor can be operated to identify the source of the light.

Based on the light measurements, a light seal module 200 can be selected with various portions that match the contours of the face of the user. For example, a recommended light seal module 200 can be one that provides a better seal against and conformity with the face of the user. By further example, where a source of light entry is identified in a given region, a recommended light seal module 200 can be one on which engagement at that region will be tighter (e.g., larger thickness to better accommodate facial contours). It will be understood that any dimensions (e.g., thickness, width, and/or height) of a recommended light seal module 200 can be considered, as described herein.

FIG. 10 illustrates a flow diagram of an example process 1000 for determining a recommended light seal module with corresponding output to a user. For explanatory purposes, the process 1000 is primarily described herein with reference to the head-mountable device 100 of FIGS. 1 and 9. However, the process 1000 is not limited to the head-mountable device 100 of FIGS. 1 and 9, and one or more blocks (or operations) of the process 1000 may be performed by different components of the head-mountable device and/or one or more other devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

The process 1000 can begin when the head-mountable device detects a face of a user (1002). Such a detection can be made by one or more sensors of the head-mountable device. Additionally or alternatively, the detection can be performed in response to an operational state of the head-mountable device (e.g., on/off state, application launch, user input command, and the like).

A light sensor of the head-mountable device (e.g., an ambient light sensor) can measure ambient light within the light seal module (1004). A total amount of ambient light can be detected on a constant or frequent basis. Based on the total amount of light (and optionally considering a known amount of light from the display elements), the head-mountable device can determine whether light entry has occurred (1006). Consideration of the known amount of light from the display elements can include detecting for more light than would be present from the display elements alone. Additionally or alternatively, such consideration can include controlling the display elements to output a certain kind or amount of light (e.g., optionally including no light).

Additionally or alternatively, the same or a different light sensor of the head-mountable device (e.g., a camera) can capture an image of a view within the light seal module (1008). Based on the image, the head-mountable device can determine the location of a gap between the light seal module and the face of the user (1010). For example, the view captured within the image can include the location of a gap and/or a region within the light seal that is reflecting light that entered through the gap. Based on the contrast of relatively light and dark regions, the image can by analyzed to determine the location of a gap.

Based on the determinations made regarding light entry and the location(s) of any gap(s), the head-mountable device can determine a recommended light seal module for use with the HMD module (1012). For example, a variety of available light seal modules with known dimensions (e.g., thicknesses, widths, and/or heights) can be compared to the optimal thicknesses, widths, and/or heights that would eliminate the gap(s) while the head-mountable device is worn by a user with the light seal module on the face of the user. The head-mountable device or other device can communicate with another device to retrieve information regarding the available light seal modules, including the dimensions thereof.

Additionally or alternatively, a recommended adjustment can be determined. Such an adjustment can be one that eliminate the gap(s) between the light seal module and the face of the user. An adjustment can be to the HMD module, the light seal module, the head securement element, and/or another component of the head-mountable device. For example, the recommended adjustment can include tightening or loosening the head securement element, which can eliminate any gap(s) between the light seal module and the face of the user. Such a recommendation can be based, at least in part, on detections made by a head securement sensor of the head securement element.

Optionally, the determination of a recommended light seal module and/or adjustment can be based, at least in part, on an operational mode and/or activity of the head-mountable device and/or the user. For example, the head-mountable device can recognize and/or provide an indication that an active operation, program, application, and/or activity involves a magnitude and/or type of movement by the user. A particular light seal module and/or adjustment may be recommended to maintain engagement with the face of the user during such an operational mode. Accordingly, the head-mountable device and/or other device can determine the recommended light seal module and/or adjustment for a duration of time (e.g., throughout the duration of the operational mode).

The head-mountable device or other device can provide an output to a user based on the recommended light seal module and/or recommended adjustment (1014). For example, the head-mountable device can provide a visual output on the display elements, a sound, or other output that communicates to the user an indication of the recommended light seal module and/or recommended adjustment. The user can then take appropriate actions to acquire, install, and/or employ the recommended light seal module and/or recommended adjustment. In some examples, the head-mountable device can communicate with another system to order a recommended light seal module. The output can further include instructions for installation of the light seal module with the HMD module and/or achieving the recommended adjustment.

Additionally or alternatively, adjustments described herein can be actively controlled by the head-mountable device itself. For example, adjustments can be made by one or more motors, actuators, and the like. Such mechanisms can be controlled by a process or other control circuitry of the head-mountable device 100, for example a component of the HMD module 110. Operable connections can be provided as needed. Control of such components can be guided by sensors that detect conditions, as described herein.

Figure 11:
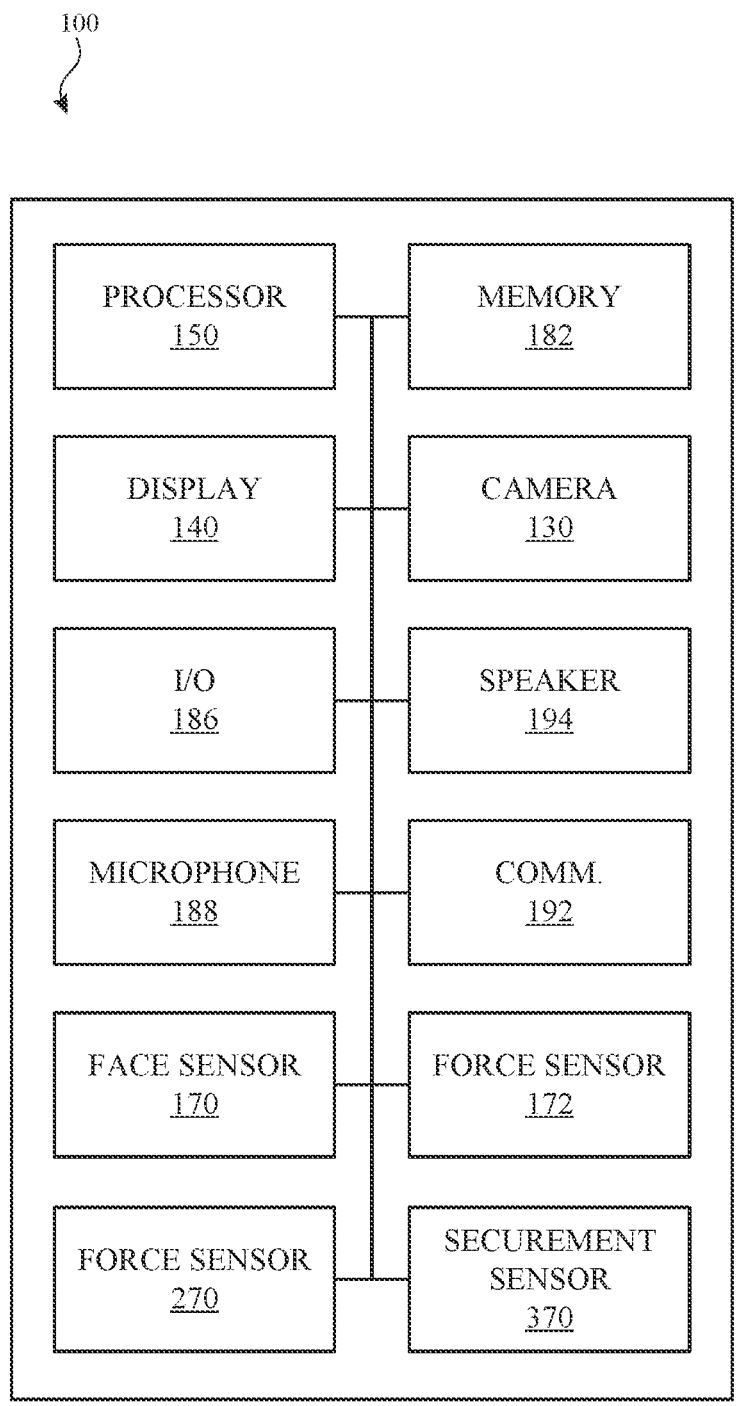
FIG. 11 illustrates a block diagram of a head-mountable device, in accordance with some embodiments of the present disclosure.

Referring now to FIG. 11, components of the head-mountable device can be operably connected to provide the performance described herein. FIG. 11 shows a simplified block diagram of an illustrative head-mountable device 100 in accordance with one embodiment of the invention. It will be appreciated that components described herein can be provided on one, some, or all of an HMD module, a light seal module, and/or a securement element. It will be understood that additional components, different components, or fewer components than those illustrated may be utilized within the scope of the subject disclosure.

As shown in FIG. 11, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can further include a camera 130 for capturing a view of an external environment, as described herein. The view captured by the camera can be presented by the display element 140 or otherwise analyzed to provide a basis for an output on the display element 140.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 190 as described herein. The speakers 190 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include one or more face sensors 170 that are operable to measure distances to multiple regions of the face of a user 10, as described herein.

The head-mountable device 100 can include one or more light sensors 172 that are operable to detect, measure, and/or identify an entry of light past a light seal module, as described herein.

The head-mountable device 100 can include one or more force sensors 270 for detecting forces applied to regions of the face of the user, as described herein.

The head-mountable device 100 can include one or more head securement sensor 370 for detecting tension in or another condition of the head securement element 300, as described herein.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include the camera 130 which can capture image based content of the outside world.

The head-mountable device 100 can include a battery, which can charge and/or power components of the head-mountable device 100. The battery can also charge and/or power components connected to the head-mountable device 100.

The head-mountable device 100 can include adjustment control components described herein, such as a motor, an actuator, and the like for moving components to a desired relative position and/or orientation.

Accordingly, embodiments of the present disclosure provide a head-mountable device with modules that provide fit adjustment capabilities when assembled together. By providing head-mountable devices with modular features, certain modules can provide fit adjustment capabilities without requiring other modules to be custom designed or available in a wide variety of sizes and/or shapes. The head-mountable device and/or other electronic devices can be operated to guide a user to select the optimal light seal module for use with an HMD module. For example, the head-mountable device or another device can include sensors for detecting features of the user's face, forces distributed on the face when worn, and/or entry of light from an external environment.

Various examples of aspects of the disclosure are described below as clauses for convenience. These are provided as examples, and do not limit the subject technology.

Clause A: a head-mountable device comprising: an HMD module comprising: an outer side; an inner side; and a display element; and an HMD module attachment element configured to engage a light seal module attachment element of a light seal module to secure the light seal module to the inner side of the HMD module, the light seal module being configured to engage a face of a user and provide a view of the display element; a sensor configured to measure distances from the sensor to multiple regions of the face of the user; a processor configured to: based on the distances to the multiple regions of the face, determine a recommended light seal module; and provide an output to the user, the output comprising an indication of the recommended light seal module.

Clause B: a head-mountable device comprising: an HMD module comprising: a frame; and a display element supported by the frame; a light seal module configured to engage the frame of the HMD module and a face of a user, the light seal module comprising force sensors configured to measure forces applied to multiple regions of the face of the user; and a processor configured to: based on the forces applied to the multiple regions of the face of the user, determine a recommended light seal module; and provide an output to the user, the output comprising an indication of the recommended light seal module.

Clause C: a head-mountable device comprising: an HMD module comprising: a frame; and a display element supported by the frame; a light seal module configured to engage the frame of the HMD module and a face of a user; a light sensor configured to detect light within the light seal module; and a processor configured to: based on the light detected by the light sensor, determine a recommended light seal module; and provide an output to the user, the output comprising an indication of the recommended light seal module.

One or more of the above clauses can include one or more of the features described below. It is noted that any of the following clauses may be combined in any combination with each other, and placed into a respective independent clause, e.g., clause A, B, or C.

Clause 1: a head securement element extending from the HMD module and configured to engage a head of the user; a microphone; a speaker; and communications circuitry for communicating with another device.

Clause 2: the light seal module having the light seal module attachment element engaged with the HMD module attachment element.

Clause 3: the multiple regions of the face comprise: a forehead; a nose; and a cheek; the distances comprise: a distance to the forehead; a distance to the nose; and a distance to the cheek; and the recommended light seal module comprises: a forehead portion configured to engage the forehead and having a forehead portion thickness corresponding to the distance to the forehead; a nose portion configured to engage the nose and having a nose portion thickness corresponding to the distance to the nose; and a cheek portion configured to engage the cheek and having a cheek portion thickness corresponding to the distance to the cheek.

Clause 4: the light seal module comprises: a chassis defining an opening; and a cover extending about the chassis.

Clause 5: the processor is further configured to: based on the distances to the multiple regions of the face, determine a recommended adjustment to a head securement element securing the HMD module against the face of the user; and provide an additional output to the user, the additional output comprising an indication of the recommended adjustment.

Clause 6: the processor is further configured to determine the recommended adjustment based on an operational mode of the HMD module.

Clause 7: the multiple regions of the face comprise: a forehead; a nose; and a cheek; the forces comprise: a force applied to the forehead; a force applied to the nose; and a force applied to the cheek; and the recommended light seal module comprises: a forehead portion configured to engage the forehead and having a forehead portion thickness corresponding to the force applied to the forehead; a nose portion configured to engage the nose and having a nose portion thickness corresponding to the force applied to the nose; and a cheek portion configured to engage the cheek and having a cheek portion thickness corresponding to the force applied to the cheek.

Clause 8: the processor is further configured to: based on the forces applied to the multiple regions of the face of the user, determine a recommended adjustment to a head securement element securing the HMD module against the face of the user; and provide an additional output to the user, the additional output comprising an indication of the recommended adjustment.

Clause 9: the light sensor is an ambient light sensor configured to determine an amount of light within the light seal; and the head-mountable device further comprises a camera configured to capture an image of a view within the light seal module.

Clause 10: the processor is further configured to operate the camera to capture the image based on the amount of light within the light seal.

Clause 11: the processor is further configured to determine the recommended light seal module based on the image of the view within the light seal module.

Clause 12: the processor is further configured to: based on the light detected by the light sensor, determine a recommended adjustment to a head securement element securing the HMD module against the face of the user; and provide an additional output to the user, the additional output comprising an indication of the recommended adjustment.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   an HMD module comprising:
      an outer side;
      an inner side; and
      a display element; and
      an HMD module attachment element configured to engage a light seal module attachment element of a light seal module to secure the light seal module to the inner side of the HMD module, the light seal module being configured to engage a face of a user and provide a view of the display element;
   a sensor configured to measure distances from the sensor to multiple regions of the face of the user;
   a processor configured to:
      based on the distances to the multiple regions of the face, determine a recommended light seal module; and
      provide an output to the user, the output comprising an indication of the recommended light seal module.

2. The head-mountable device of claim 1, further comprising:
   a head securement element extending from the HMD module and configured to engage a head of the user;
   a microphone;
   a speaker; and
   communications circuitry for communicating with another device.

3. The head-mountable device of claim 1, further comprising the light seal module having the light seal module attachment element engaged with the HMD module attachment element.

4. The head-mountable device of claim 1, wherein:
   the distances comprise:
      a distance to a forehead of the user;
      a distance to a nose of the user; and
      a distance to a cheek of the user; and
   the recommended light seal module comprises:
      a forehead portion configured to engage the forehead and having a forehead portion thickness corresponding to the distance to the forehead;
      a nose portion configured to engage the nose and having a nose portion thickness corresponding to the distance to the nose; and
      a cheek portion configured to engage the cheek and having a cheek portion thickness corresponding to the distance to the cheek.

5. The head-mountable device of claim 1, wherein the light seal module comprises:
   a chassis defining an opening; and
   a cover extending about the chassis.

6. The head-mountable device of claim 1, wherein the processor is further configured to:
   based on the distances to the multiple regions of the face, determine a recommended adjustment to a head securement element securing the HMD module against the face of the user; and
   provide an additional output to the user, the additional output comprising an indication of the recommended adjustment.

7. The head-mountable device of claim 1, wherein the processor is further configured to determine the recommended adjustment based on an operational mode of the HMD module.

8. A head-mountable device comprising:
   an HMD module comprising:
      a frame; and
      a display element supported by the frame;
   a light seal module configured to engage the frame of the HMD module and a face of a user, the light seal module comprising force sensors configured to measure forces applied to multiple regions of the face of the user; and
   a processor configured to:
      based on the forces applied to the multiple regions of the face of the user, determine a recommended light seal module; and
      provide an output to the user, the output comprising an indication of the recommended light seal module.

9. The head-mountable device of claim 8, wherein:
   the force sensors comprise:
      a first force sensor configured to measure a first force applied to a forehead of the user;
      a second force sensor configured to measure a second force applied to a nose of the user; and
      a third force sensor configured to measure a third force applied to a cheek of the user; and
   the recommended light seal module comprises:
      a forehead portion configured to engage the forehead and having a forehead portion thickness corresponding to the first force applied to the forehead;
      a nose portion configured to engage the nose and having a nose portion thickness corresponding to the second force applied to the nose; and
      a cheek portion configured to engage the cheek and having a cheek portion thickness corresponding to the third force applied to the cheek.

10. The head-mountable device of claim 8, wherein:
    the HMD module comprises HMD module attachment elements; and
    the light seal module comprises light seal module attachment elements configured to releasably engage the HMD module attachment elements.

11. The head-mountable device of claim 8, wherein the light seal module comprises:
a chassis defining an opening; and
a cover extending about the chassis.

12. The head-mountable device of claim 8, wherein the processor is further configured to:
based on the forces applied to the multiple regions of the face of the user, determine a recommended adjustment to a head securement element securing the HMD module against the face of the user; and
provide an additional output to the user, the additional output comprising an indication of the recommended adjustment.

13. The head-mountable device of claim 8, wherein the processor is further configured to determine the recommended adjustment based on an operational mode of the HMD module.

14. A head-mountable device comprising:
an HMD module comprising:
a frame; and
a display element supported by the frame;
a light seal module configured to engage the frame of the HMD module and a face of a user;
a light sensor configured to detect light within the light seal module; and
a processor configured to:
based on the light detected by the light sensor, determine a recommended light seal module; and
provide an output to the user, the output comprising an indication of the recommended light seal module.

15. The head-mountable device of claim 14, wherein:
the light sensor is an ambient light sensor configured to determine an amount of light within the light seal; and
the head-mountable device further comprises a camera configured to capture an image of a view within the light seal module.

16. The head-mountable device of claim 15, wherein the processor is further configured to operate the camera to capture the image based on the amount of light within the light seal.

17. The head-mountable device of claim 16, wherein the processor is further configured to determine the recommended light seal module based on the image of the view within the light seal module.

18. The head-mountable device of claim 14, wherein:
the HMD module further comprises HMD module attachment elements; and
the light seal module comprises light seal module attachment elements configured to releasably engage the HMD module attachment elements.

19. The head-mountable device of claim 14, wherein the light seal module comprises:
a chassis defining an opening; and
a cover extending about the chassis.

20. The head-mountable device of claim 14, wherein the processor is further configured to:
based on the light detected by the light sensor, determine a recommended adjustment to a head securement element securing the HMD module against the face of the user; and
provide an additional output to the user, the additional output comprising an indication of the recommended adjustment.

* * * * *